(12) United States Patent
Bachar et al.

(10) Patent No.: US 8,683,480 B2
(45) Date of Patent: *Mar. 25, 2014

(54) RESOURCE ALLOCATION FOR A PLURALITY OF RESOURCES FOR A DUAL ACTIVITY SYSTEM

(75) Inventors: Yariv Bachar, Ma'abarot (IL); Ron Edelstein, Tel Aviv (IL); Oded Sonin, Omer (IL)

(73) Assignee: International Business Machines Corporation, Armonk, NY (US)

( * ) Notice: Subject to any disclaimer, the term of this patent is extended or adjusted under 35 U.S.C. 154(b) by 108 days.

This patent is subject to a terminal disclaimer.

(21) Appl. No.: 13/151,075

(22) Filed: Jun. 1, 2011

(65) Prior Publication Data

US 2012/0311598 A1    Dec. 6, 2012

(51) Int. Cl.
   *G06F 9/50* (2006.01)
(52) U.S. Cl.
   USPC .......................................... 718/104; 718/103
(58) Field of Classification Search
   None
   See application file for complete search history.

(56) References Cited

U.S. PATENT DOCUMENTS

| | | | |
|---|---|---|---|
| 2002/0059427 A1* | 5/2002 | Tamaki et al. | 709/226 |
| 2004/0111509 A1 | 6/2004 | Eilam et al. | |
| 2005/0055694 A1 | 3/2005 | Lee | |
| 2005/0165925 A1 | 7/2005 | Dan et al. | |
| 2009/0025004 A1* | 1/2009 | Barnard et al. | 718/104 |
| 2009/0138883 A1 | 5/2009 | McLean | |
| 2010/0228858 A1 | 9/2010 | Eilam et al. | |
| 2010/0325283 A1 | 12/2010 | Luzzatti et al. | |

FOREIGN PATENT DOCUMENTS

| | | |
|---|---|---|
| CN | 101345713 A | 1/2009 |
| CN | 101765160 A | 6/2010 |
| WO | WO9917482 A2 | 4/1999 |

* cited by examiner

*Primary Examiner* — Lewis A Bullock, Jr.
*Assistant Examiner* — Melissa Alfred
(74) *Attorney, Agent, or Firm* — Griffiths & Seaton PLLC

(57) ABSTRACT

Exemplary system and computer program product embodiments for resource allocation of a plurality of resources for a dual activity system by a processor device, are provided. In one embodiment, by way of example only, each of the activities may be started at a static quota. The resource boundary may be increased for a resource request for at least one of the dual activities until a resource request for an alternative one of the at least one of the dual activities is rejected. In response to the rejection of the resource request for the alternative one of the at least one of the dual activities, a resource boundary for the at least one of the dual activities may be reduced, and a wait after decrease mode may be commenced until a current resource usage is one of less than and equal to the reduced resource boundary.

13 Claims, 8 Drawing Sheets

RESOURCE ALLOCATION FOR A PLURALITY OF RESOURCES FOR A DUAL ACTIVITY SYSTEM

BACKGROUND OF THE INVENTION

1. Field of the Invention

The present invention relates in general to computers, and more particularly to resource allocation of a plurality of resources for a dual activity system by a processor device in a computing environment.

2. Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems include virtual storage components.

Within the computing environment, system resources may be required to perform a variety of operations and services. Systems that maintain simultaneously running activities are often constrained by their dependency on resources that may only be used by one activity at a time. The challenge in such systems is to distribute a limited number of resources between the different activities, while considering the resource availability and the activities' need and priority.

SUMMARY OF THE DESCRIBED EMBODIMENTS

Computer systems that perform and support simultaneously running dual activities are constrained by a dependency on the computer systems resources, which may only be allocated, used, or employed by only one activity at a time. These computer systems are faced with the challenge of distributing, allocating, and/or assigning a limited number of system resources between these different dual activities, while considering the availability of the computing resource and the dual activities' need and priority. As a result, efficiency and productivity may be reduced.

Accordingly, and in view of the foregoing, various exemplary method, system, and computer program product embodiments for resource allocation of a plurality of resources for a dual activity system by a processor device, are provided. In one embodiment, by way of example only, each of the activities may be started at a static quota. The resource boundary may be increased for a resource request for at least one of the dual activities until a resource request for an alternative one of the at least one of the dual activities is rejected. In response to the rejection of the resource request for the alternative one of the at least one of the dual activities, a resource boundary for the at least one of the dual activities may be reduced, and a wait after decrease mode may be commenced until a current resource usage is one of less than and equal to the reduced resource boundary.

In addition to the foregoing exemplary method embodiment, other exemplary system and computer product embodiments are provided and contribute related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
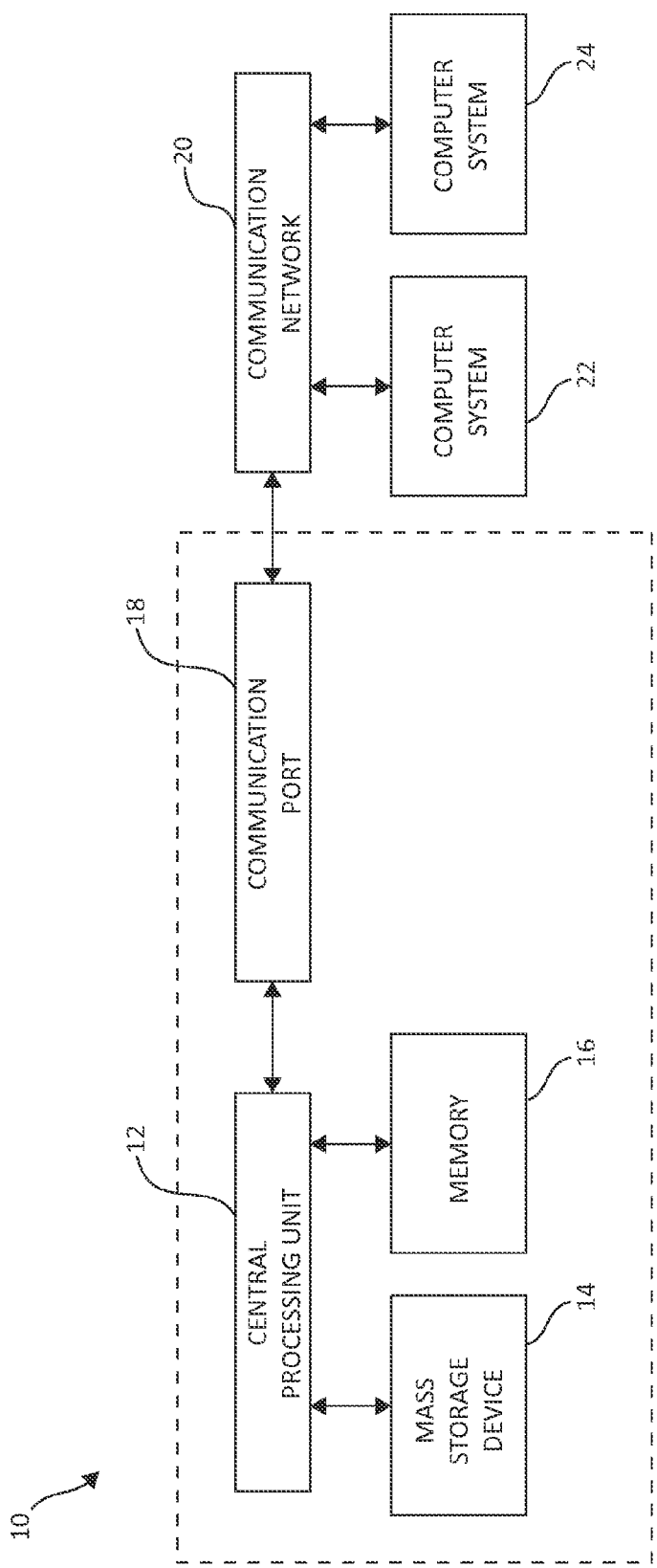
FIG. 1 illustrates a computer storage environment having an example storage device in which aspects of the present invention may be realized.

Throughout the following description and claimed subject matter, the following terminology, pertaining to the illustrated embodiments, is described. The definitions may form a table of suitable of definitions, form matrices for suitable purposes if needed, and for certain terms used herein.

A "Global Resource Limit (GRL)" is intended herein to include the total number of resources that are available for the dual activities.

An "Activity Weight" is intended herein to include the predefined number that is assigned to each dual activity, which represents the priority the dual activity should have with relation to resource allocation. The activity with a higher weight will have precedence over the activity with the lower weight.

A "Static Quota" (per activity) is intended herein to include the initial resource share that is assigned to each dual activity. It is derived from the GRL and the activity weight, and is calculated to be the dual activity's relative part of the global resources. The static quota is calculated according to the formula as depicted the following equation:

$$SQ_i = (AW_i * GRL)/(\Sigma_j AW_j) \quad (1),$$

where $SQ_i$ is the ith Static Quota, $AW_i$ is the ith Activity weight, and GRL is the global resource limit, and $\Sigma_j$ is the jth sum of the $AW_j$, which is the jth Activity Weight.

An "Actual Resource Boundary" (per activity) is intended herein to include the current resource limit that is assigned to each activity. This boundary may be set by the resource allocator. This may not be lower than the activity's static quota.

A "Current Resource Usage" (per activity) is intended herein to include the current number of resources that are allocated to an activity.

A "Feedback Control Algorithm" (FCA) is intended herein to include the algorithm that utilizes the behavior of a system to change its operation in order to constantly reduce the difference between the output and a target value.

An "Activity Resource Limit" (per activity) is intended herein to include the limit on the number of resources that an activity may have at the same time. This number may not be higher than the GRL.

An "Additive Increase/Multiplicative Decrease" (AIMD) is intended herein to include the feedback control algorithm that is used in transmission control protocol (TCP) congestion avoidance. It combines linear growth of the congestion window with an exponential reduction when congestion takes place, and thus constitutes an example to a feedback control algorithm that maintains the required FCA properties, as mentioned below in FIG. 3. An adaptation of this algorithm may be used, only by way of example, to describe the implementation of controlling the resources.

An "Additive Factor" is intended herein to include the additive part of the adapted AIMD algorithm that is used for the dynamic resource allocation. This factor represents the increase in an activity's actual resource boundary, per second, when a boundary is maintained for the activity.

A Multiplicative Factor" is intended herein to include the multiplicative part of the adapted AIMD algorithm that is used for the dynamic resource allocation. This parameter represents the factor of decrease that should be applied to the actual boundary of an activity, once requests from the other activity were rejected.

A "Dynamic Base" is intended herein to include the basis of the actual resource boundary dynamic calculation. The actual resource boundary is determined using this base and the additive factor. This boundary is updated whenever a multiplicative decrease occurs.

A "Dynamic Base Age" is intended herein to include a time period (e.g., the time period may be an variable amount based upon various embodiments such as seconds or microseconds) that passed since the last time the dynamic base was updated. This is used in the calculation of an activity's actual resource boundary (e.g., the dynamic and/or more or less demanding activities actual resource boundary).

As previously mentioned, computing systems that maintain simultaneously running activities are often constrained by their dependency on resources that may only be used by one activity at a time. These systems are faced with the challenge to distribute a limited number of resources between the different activities, while considering the availability of the computing resource and the activities' need and priority. Resource allocation may be a procedure for scheduling and assigning various resources to activities, while considering the resource availability vis-à-vis the activities' constraints. Activities that require resources may issue resource requests for allocation of the needed resources. However, these resource requests may be accepted or rejected. The resource allocation may be static or dynamic. In static resource allocation, the system's resources may be statically divided between the activities with the resource-share per activity being fixed throughout the system's lifetime. Thus, when a resource request is issued by an activity, the request will only be accepted if the resource-share per activity (the resource that is assigned to that activity) is not being used. Although this approach may be easier to implement, resources may be wasted in certain systems, e.g. where one activity is not using its share of resources at all while another is constantly capped at its resource boundary.

In dynamic resource allocation, the resource-share per activity may be determined during run-time, according to resource demand. In this manner, activities that require a large amount of resources are favored over activities that require a small amount of resources. Should the demand for requirements change, the resource allocation processes may need to adapt the resource-share per activity during runtime. Dynamic resource allocation mechanisms may utilize pending (i.e. not yet issued) resource requests in order to optimize the resource allocation scheme. For instance, if one activity has twice as many pending requests than the other, a decision to reject some of the requests of the lower-demanding activity may be issued in order to prepare for the higher amount of requests that are expected to be issued from another activity. While this approach allows for a certain amount of optimization for resource allocation, it requires the activities to share the activities pending requests with a resource allocator. Such a process may not always be practical. In certain system configurations it may be difficult to share the number of pending resource requests per activity with the resource allocation mechanisms, e.g. when the requests arrive via a network link with only enough bandwidth for the requests themselves. In such cases, the resource allocation requests are made available to the resource allocation mechanisms only once they are issued.

In contrast, and to address the inefficiencies and performance issues previously described, the illustrated embodiments provide mechanisms for resource allocation of resources for dual activities systems with unpredictable loads. The mechanisms, for example, may start each of the dual activities at a static quota. The resource boundary may be increased for a resource request for a more demanding one of the dual activities until a resource request for a less demanding one of the dual activities is rejected. In response to the rejection of the resource request for the less demanding one of the dual activities, a resource boundary for the more demanding one of the dual activities may be reduced, a wait after decrease mode may be commenced and will continue without stopping until a current resource usage of the more demanding one of the dual activites is either less than and/or equal to the resource boundary of the more demanding one of the dual activites.

Thus, the mechanisms of the present invention will satisfy the following essential requirements for resource allocation of resources for dual activities systems with unpredictable loads: (1) allocate resources according to predefined priorities per activity, for which an activity with a higher priority will be assigned a higher resource share than one with a lower priority, (2) adjust to changes in resource requests and dynamically assign more resources to an activity with higher demand at the expense of an activity that is not currently using its resource share, (3) avoid starvation of a less-demanding activity, i.e. if one activity demands more resources and the other doesn't, once the latter requires resources, it will not be starved, and (4) operate with unpredictable loads, i.e. unaware of pending resource requests. The resource allocation scheme should be based only on previously issued resource requests.

Turning now to FIG. 1, exemplary architecture 10 of data storage systems (e.g., virtual tape systems) for resource allocation of resources for dual activities systems in a computing environment is depicted. The computer system 10 includes central processing unit (CPU) 12, which is connected to mass storage device(s) 14 and memory device 16. Mass storage devices may include hard disk drive (HDD) devices, solid state devices (SSD) etc, which may be configured in a redundant array of independent disks (RAID). The backup operations further described may be executed on device(s) 14, located in system 10 or elsewhere. Memory device 16 may include such memory as electrically erasable programmable read only memory (EEPROM) or a host of related devices. Memory device 16 and mass storage device 14 are connected to CPU 12 via a signal-bearing medium. In addition, CPU 12 may be connected through communication port 18 to a communication network 20, having an attached plurality of additional computer systems 22 and 24.

Figure 2:
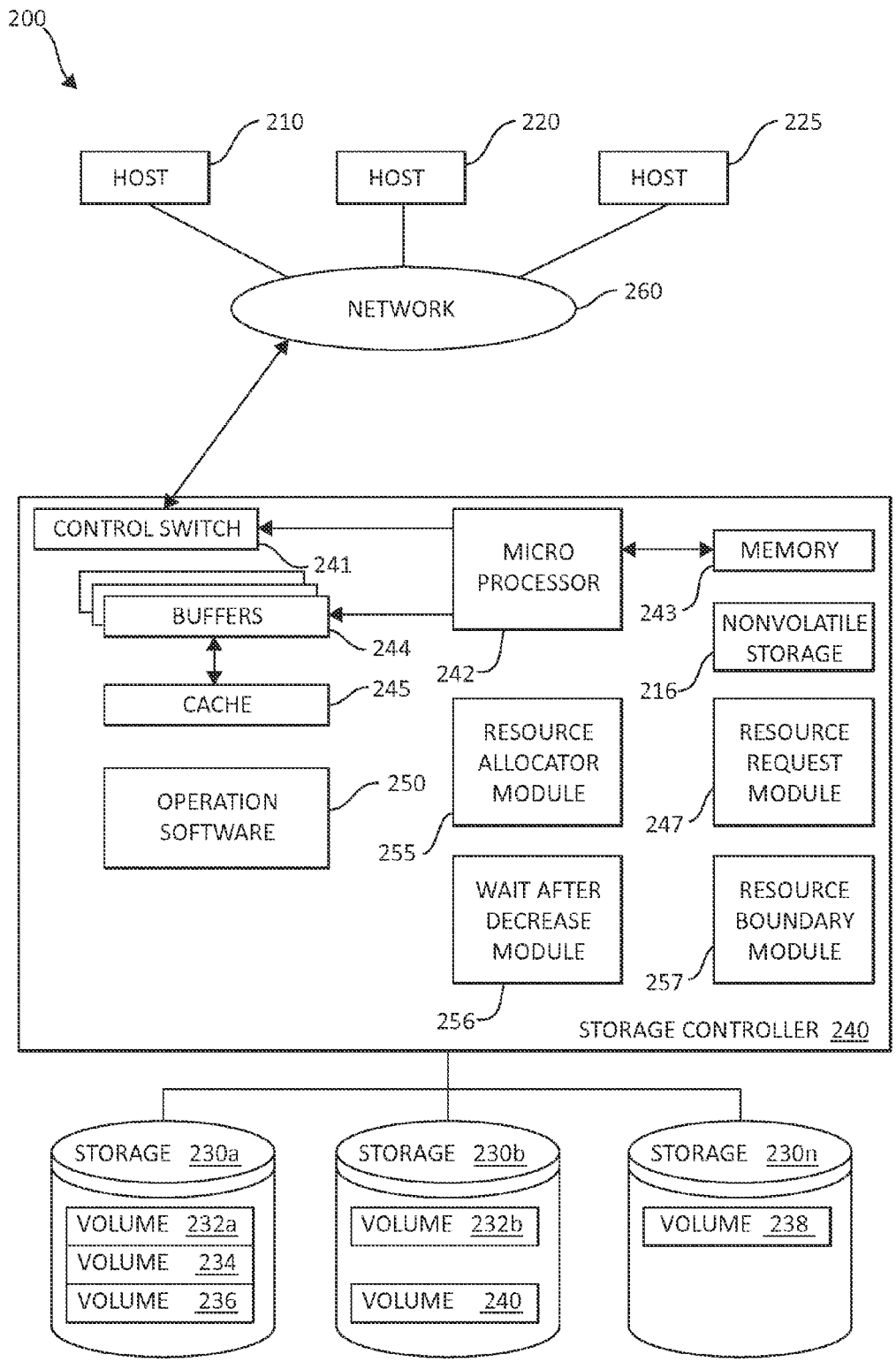
FIG. 2 illustrates an exemplary block diagram showing a hardware structure of a data storage system in a computer system in which aspects of the present invention may be realized.

FIG. 2 is an exemplary block diagram 200 showing a hardware structure of a data storage system in a computer system according to the present invention. It should be noted that the mechanisms of the present invention describes any dual activity computing system, which may require resource allocation. In one exemplary embodiment, by way of example only, a storage sub-system or storage controller is described but is not intended to limit the scope of the present invention. Referring to FIG. 2, there are shown host computers 210, 220, 225, each acting as a central processing unit for performing data processing a part of a data storage system 200 for resource allocation of resources for dual activities systems. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 1 comprising storage controller 240 and storage 230.

To facilitate a clearer understanding of the methods described herein, in one exemplary embodiment, by way of example only, a storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, by way of example only, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps associated with managing storage 230 and executing the steps and methods of the present invention for resource allocation of resources for dual activities systems in a computer storage environment. In one embodiment, system memory 243 includes, is associated, or is in communication with the operation software 250 for resource allocation of resources for dual activities systems in a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller may be accessible by microprocessor 242 and serves to provide additional support for operations and execution of the present invention as described in other figures. The NVS 216, may also referred to as a "persistent" cache, or "cache memory" and may be implemented with nonvolatile memory that may or may not utilize external power to retain data stored therein. The NVS may be stored in and with the Cache 245 for any purposes suited to accomplish the objectives of the present invention. In some embodiments, a backup power source (not shown in FIG. 2), such a battery, supplies NVS 216 with sufficient power to retain the data stored therein in case of power loss to data storage system 200. In certain embodiments, the capacity of NVS 216 may be less than or equal to the total capacity of cache 245.

Storage 230 may be physically comprised of one or more storage devices, such as storage arrays. A storage array may be a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230*a*, 230*b* and 230*n* are shown as ranks in data storage system 200, and are referred to herein as rank 230*a*, 230*b* and 230*n*. Ranks may be local to data storage system 200, or may be located at a physically remote location. In other words, a local storage controller may connect with a remote storage controller and manage storage at the remote location. Rank 230*a* is shown configured with two entire volumes, 234 and 236, as well as one partial volume 232*a*. Rank 230*b* is shown with another partial volume 232*b*. Thus volume 232 may be allocated across ranks 230*a* and 230*b*. Rank 230*n* is shown as being fully allocated to volume 238— that is, rank 230*n* refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

In one embodiment, by way of example only, the storage controller 240 may include a resource allocator module 255, a wait after decrease (or may be referred to as waiting after decrease throughout the specification and drawings) module 256, a resource boundary module 257, and a resource request module 247 to assist with resource allocation of resources for dual activities systems in a computing environment. The resource allocator module 255, the wait after decrease module 256, the resource boundary module 257, and resource request module 247 may each be adapted to include one or more feedback control modules (not shown) and/or be configured to be in communication with one or more feedback control modules (not shown). The resource allocator module 255, the wait after decrease module 256, the resource boundary module 257, and resource request module 247 may work in conjunction with each and every component of the storage controller 240, the hosts 210, 220, 225, and storage devices 230. Both the resource allocator module 255, the wait after decrease module 256, the resource boundary module 257, and resource request module 247 may be structurally one complete module working together and in conjunction with each other for resource allocation of resources for dual activities systems in a computing environment or may be individual modules, performing individual functions as designed and configured according to the mechanisms described below. If the resource allocator module 255, the wait after decrease module 256, the resource boundary module 257, and resource request module 247 are one module, a feedback control module (not shown) may be implemented together in the one complete module. The resource allocator module 255, the wait after decrease module 256, the resource boundary module 257, and resource request module 247 may also be located in the cache 245 or other components of the storage controller 240 to accomplish the purposes of the present invention.

The storage controller 240 may be constructed with a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240 data for control, cache 245 for temporarily storing (buffering) data, and buffers 244 for assisting the cache 245 to read and write data, a control switch 241 for controlling a protocol to control data transfer to or from the storage devices 230, resource allocator module 255, the wait after decrease module 256, the resource boundary module 257, and the resource request module 247 on which information may be set. Multiple buffers 244 may be implemented with the present invention to assist with the resource allocation of resources for a dual activity system in a computing environment.

In one embodiment, by way of example only, the host computers or one or more physical or virtual devices, 210, 220, 225 and the storage controller 240 are connected through a network adaptor (this could be a fiber channel) 260 as an interface i.e., via a switch called "Fabric." In one embodiment, by way of example only, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, resource allocator module 255, the wait after decrease module 256, the resource boundary module 257, and resource request module 247 are in communication with each other and may be separate or one individual component(s). Also, several, if not all of the components, such as the operation software 245 may be included with the memory 243 for resource allocation of resources for a dual activity system in a computing environment. Each of the components within the storage device may be linked together and may be in communication with each other for purposes suited to the present invention.

Figure 3:
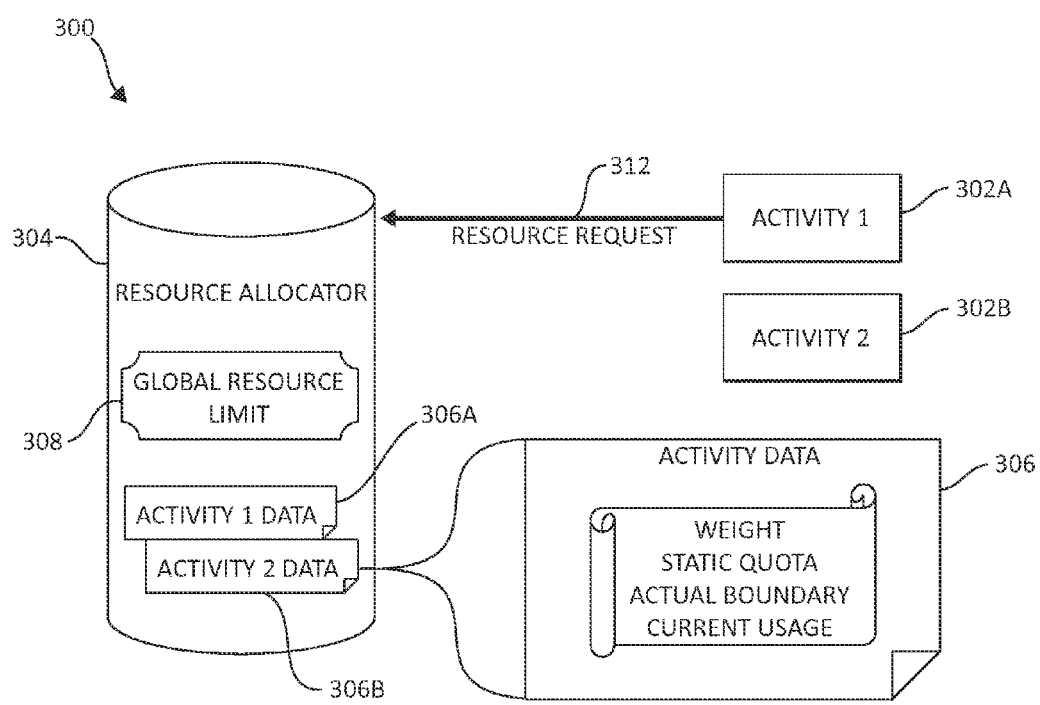
FIG. 3 illustrates an exemplary block diagram showing a computing environment with components for resource allocation of resources for a dual activity system in which aspects of the present invention may be realized.

As previously mentioned, the illustrated embodiments provide mechanisms for resource allocation of a plurality of resources for a dual activities system within a computing environment. FIG. 3 illustrates an exemplary block diagram 300 showing a computing environment with components for resource allocation of resources for a dual activity system. Resource requests 312 issued by an activity 302 (Activity 1 302A and Activity 2 302B) are accepted -only if the activity's current resource usage (obtained from the Activity Data 306) is lower than the activity's actual resource boundary. Requests 312 from an activity 302 that has exceeded this boundary may be rejected. The actual resource boundary of an activity 302 may be initially set to the activity's static quota and the current resource usage of each activity may be set to zero (e.g., the activity data 306). Thus, the issued resource requests 312 from an activity 302 that has not yet exceeded its static quota (e.g., obtained from the activity data 306) are likely to be accepted.

Once an activity 302 (e.g., 302A) has reached its static quota its actual resource boundary may be decided dynamically, during runtime, by a feedback control algorithm (FCA), which may be affected by both this activity's 302 (e.g., 302A) load and by the resource load that may be required by the other activity, which may be less demanding (e.g., 302B if 302A is the more demanding activity). The activity 302 (e.g., 302A) will be referred to as the dynamic activity (or more demanding activity). The FCA needs to have the following properties, as will be described. As long as the other activity's (e.g., 302B if 302A is the more demanding activity) requests 312 for resources are not rejected, the FCA will allow the actual resource boundary of the dynamic activity to be gradually incremented. Once the current number of resources taken by the dynamic activity is higher than the activity's static quota, the effective boundary of the other activity (e.g., 302B if 302A is the more demanding activity) is the difference between the global resource limit (GRL) and the current resource usage of this activity (e.g., 302A). Consequently, the other activity's (e.g., 302B if 302A is the more demanding activity) requests may be rejected even though its current resource usage is lower than its static quota. Once a request for resources by the other activity (e.g., 302B if 302A is the more demanding activity) is rejected—the FCA will rapidly decrease the actual resource boundary of the dynamic activity (e.g., 302A). Since the actual resource boundary may not be lower than the static quota, the FCA may only decrease the actual resource boundary to the activity's static quota. This utilization of feedback controls enables resource allocation for an activity with a higher resource need to gradually take precedence over an activity with a lower resource need. However, once the activity load changes, the changed behavior may cause other activities' requests to be rejected, and the actual resource boundary may be rapidly adjusted to accommodate the change. Hence, the mechanisms of the present invention provide the ability to achieve dynamic resource allocation.

The mechanisms of the illustrated embodiments seek, for example, to address and satisfy a comprehensive set of dynamic resource allocation requirements, listed as follows. First, using the activity weight, the mechanisms supports predefined prioritization of activities, where one activity may be favored over the other. Second, the utilization of a feedback control algorithm allows the mechanisms to dynamically adjust to changes in resource requests and assign more resources to activities with higher demand at the expense of activities that are not using their share of resources. Third, the above mentioned algorithm verifies that a less demanding activity will not be starved, e.g., if one activity demands more resources and the other doesn't, once the latter requires resources, the feedback control algorithm will rapidly adjust to accommodate its requests. Fourth, the mechanisms may operate in unpredictable load, i.e. it does not require the mechanisms to be aware of any pending resource requests. All decision may be based solely on resource requests already issued and not on pending, future requests.

Figure 4:
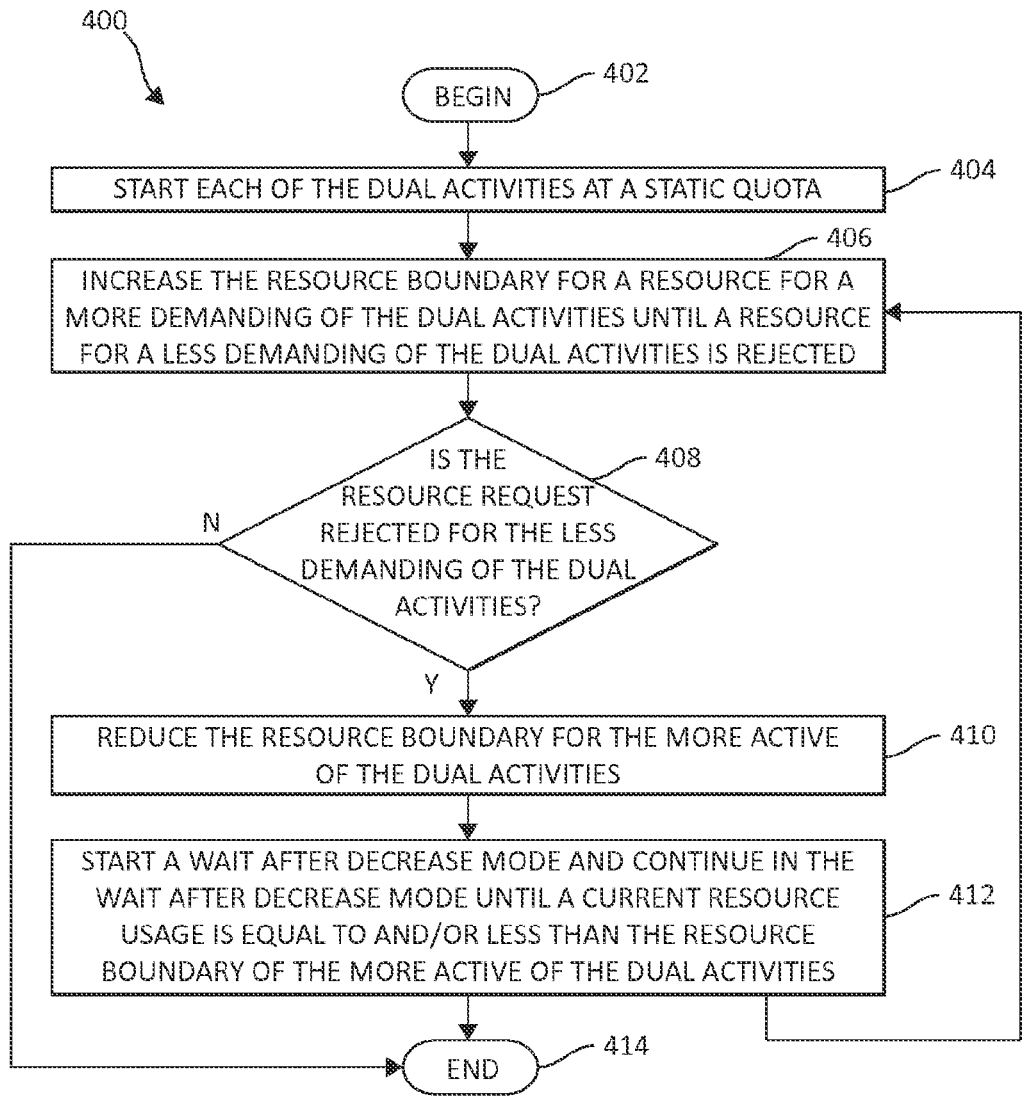
FIG. 4 is a flowchart illustrating an exemplary method for resource allocation of resources for a dual activity system.

As will be described below, in one embodiment the mechanisms seek to address the comprehensive set of dynamic resource allocation requirements, as previously mentioned. FIG. 4 is a flowchart illustrating an exemplary method 400 for resource allocation of resources for a dual activity system. The method 400 begins (step 402) by starting each of the dual activities at a static quota (step 404). The static quota may be fixed and/or a variable static quota and configured/adapted to change over time, if necessary. The resource boundary may be increased for a resource request for a more demanding of the dual activity (activities) until a resource request for a less demanding of the dual activity (activities) may be rejected (step 406). The method 400 will determine if the resource request is rejected for the less demanding of the dual activity (activities) (step 408). In response to the rejection of the resource request for the less demanding of the dual activities, the resource boundary for the more active dual activities may be reduced (step 410). A wait after decrease mode will start and the method 700 may continue in the wait after decrease mode until a current resource usage is equal to and/or less than the resource boundary of the more active dual activity (activities) that was reduced (step 412). Since the resource allocation may be an ongoing process, the method 400 may repeat and return to step 406 and continue to increase the resource boundary for a resource request for a more demanding dual activity (activities) until a resource request for a less demanding dual activity (activities) may be rejected. The method will continue with each subsequent step following step 406. The method 400 ends (step 414).

Figure 5:
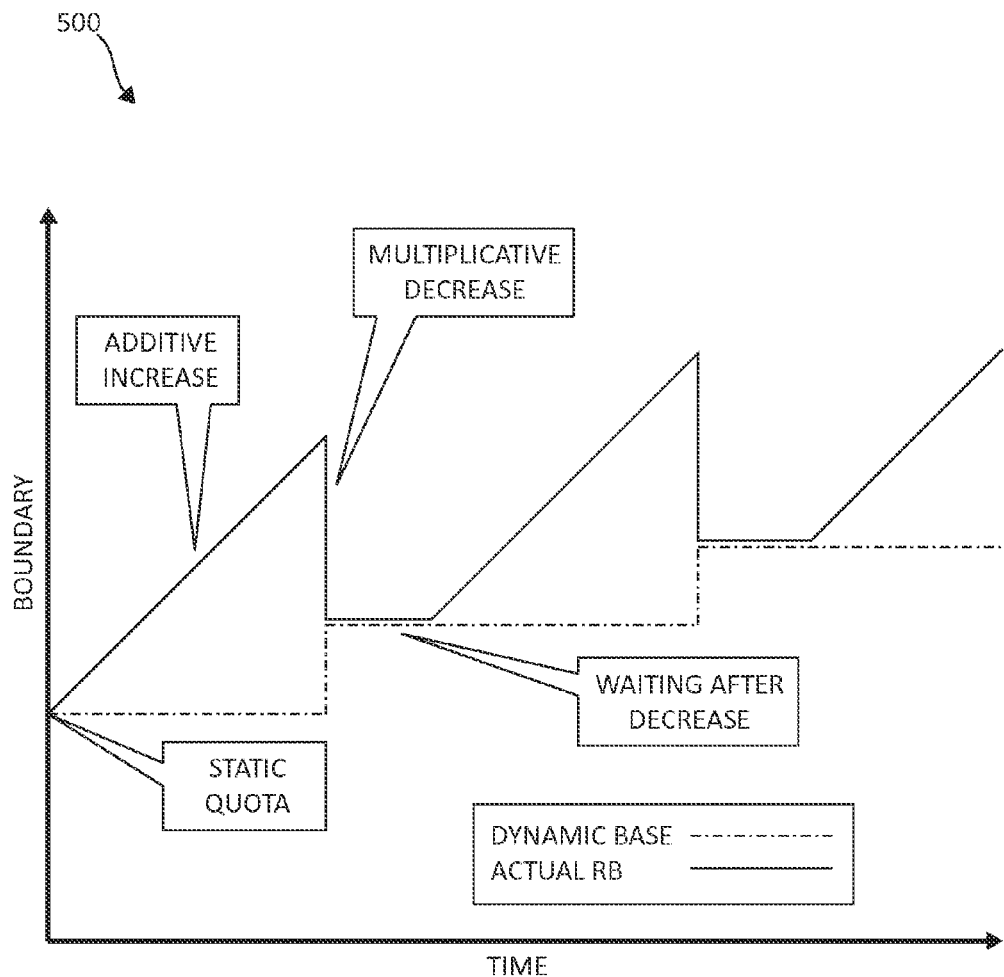
FIG. 5 illustrates an exemplary snapshot illustrating a computing environment depicting the behavior of the actual resource boundary over time.

In one embodiment, when one of the dual activities requires a resource it may issue a resource request. The mechanisms keeps track of the number of resources each activity has (e.g., the current resource usage) and utilizes the current resource usage together with the activity's resource boundaries, to determine whether or not to accept the request. If the mechanisms accept the resource request, once the activity finishes using the resource, the activity may send a notification indicating the resource is now free/available and the current resource usage of the activity may be updated accordingly. If the resource request is rejected, the resource boundary and dynamic base react accordingly, as described in greater detail in FIG. 5. FIG. 5 depicts the behavior of the actual resource boundary and dynamic base of a dynamic activity. FIG. 5 illustrates an exemplary snapshot illustrating a computing environment depicting the behavior of the actual resource boundary over time. The actual resource boundary of a dynamic activity may be generally determined by the activity's dynamic base, dynamic base age and the additive factor, as described in the following equation:

$$RB=DB+(DBA)*(AF) \qquad (2),$$

where RB is the resource boundary (e.g., the actual resource boundary), DB is the dynamic base, DBA is the dynamic base age, and AF is the additive factor. The dynamic base is initially set to the activity's static quota and does not change as long as there are no multiplicative decreases occurring. Once a request from the other activity (e.g., less demanding dual activity) is rejected, a multiplicative decrease may be performed and the actual resource boundary may be updated. In one embodiment, the following equation illustrates how the multiplicative decrease is performed.

$$DB=(CRB)*(MF) \qquad (3),$$

where DB is the dynamic base, CRB is the current actual resource boundary, and MF is the multiplicative factor. The multiplicative decrease resets the dynamic base age, and thus, immediately after the decrease takes place, the actual resource boundary may become the new dynamic base. Once a multiplicative decrease takes place, the mechanisms wait for the current resource usage of the activity to actually reach the new boundary, in a state called wait after decrease. This prevents the activity's actual resource boundary to drop dramatically in case the other activity is being constantly rejected. As long as the current resource usage of the activity hasn't reached the new (decreased) actual resource boundary, the actual resource boundary stays constant, meaning the resource boundary is not additively increased nor multiplicatively decreased. Once the current resource usage of the activity reaches the resource boundary (e.g., the current resource usage of the activity is less than and/or equal to the resource boundary), the dynamic base age is updated, and the additive increase of the resource boundary is re-started.

Figure 6:
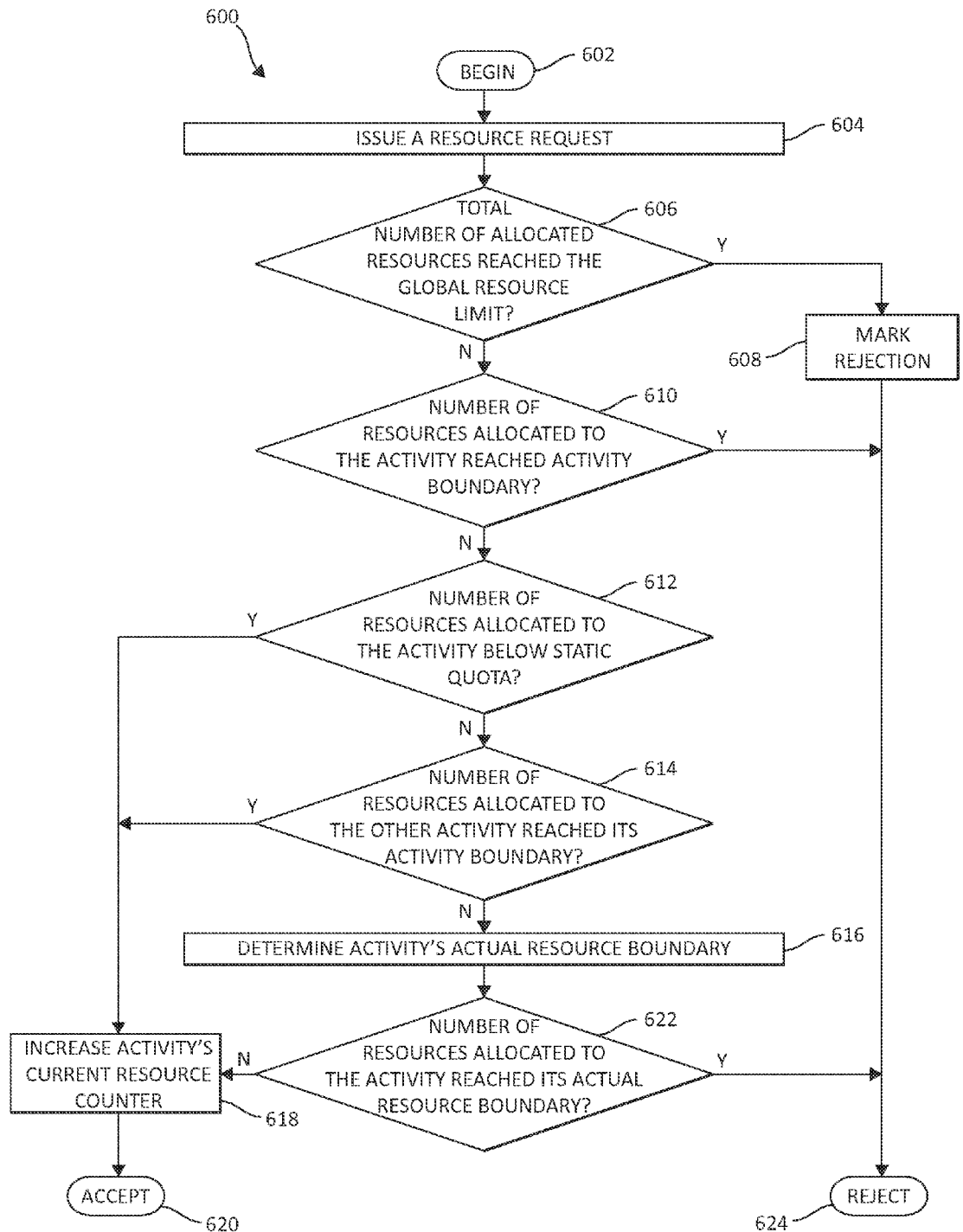
FIG. 6 is a flowchart illustrating an exemplary method for processing a resource request.

As mentioned above (e.g., FIG. 3 and FIG. 4), the dual activities may issue a resource request for use of a resource. With the foregoing in mind, FIG. 6 is a flowchart illustrating an exemplary method 600 for processing a resource request. The method 600 begins (step 602) by issuing a resource request (step 604). The method 600 will then determine if the total number of allocated resources has reached the global resource limit (GRL) (step 606). If yes, the resource request may be marked (step 608) and rejected (step 624). If no, the method 600 will determine if the number of resources allocated to the activity has reached the activity boundary (step 610). If yes, the resource request may be rejected (step 624). If no, the method 600 will determine if the number of resources allocated to the activity are below the static quota (step 612). If yes, the activities current resource counter may be increased (step 618) and the resource request may be accepted (step 620). If no, the method 600 will determine if the number of resources allocated to other activity (e.g., the other activity may be either the more or the less demanding of the dual activities) has reached its activity boundary (step 614). If yes, the activities current resource counter may be increased (step 618) and the resource request may be accepted (step 620). If no, the activities actual resource boundary may be determined (step 616). The method 600 will then determine if the number of resources allocated to the activity has reached its actual resource boundary (step 622). If no, the activities current resource counter may be increased (step 618) and the resource request may be accepted (step 620). If yes, the resource request may be rejected (step 624).

In an alternative embodiment, upon receiving of request for a resource, the mechanisms of the present invention determines whether the total number of resources allocated so far (to both activities) has reached the global resource limit (GRL). If the GLR has been reached, there may be no more resources to allocate (until some activity frees some of its resources), thus, the request may be rejected. The rejection may be marked and the mechanisms notify the dynamic resource boundaries (e.g, resource boundary module 257 of FIG. 2) of the rejection (see FIG. 8). If the GRL was not reached, the mechanisms determine if the number of resources that were allocated to the requesting activity has reached the activity's resource limit. If so, again, there will be no available resources to be allocated for this activity (until it frees some of its resources), and thus, the request may be rejected. If the number of resources that were allocated to the requesting activity has not reached the activity's resource limit, the mechanisms determine if the number of resources that were allocated to the requesting activity is lower than the activity's static quota. If so, then resources are available (since the total number of allocated resources is below the GRL) and the activity may be conclusively eligible for using a resource because the activities weighted resource-share (i.e. the static quota) has not been consumed. The mechanisms may increase the activity's current resource usage counter and accept the request. In the event the number of resources that were allocated to the requesting activity is higher than the activity's static quota, the mechanisms determines whether the other activity (e.g., the other activity may be either the more or less demanding dual activity) has reached its activity's resource limit. If that is the case, then the other activity will not receive or be issued any further resources. Thus, since there are available resources (since the total number of allocated resources is below the GRL), the resource request may safely be accepted. The mechanisms may increase the activity's current resource usage counter and accept the request. If the other activity (e.g., less demanding dual activity) has reached its activity's resource limit, the activity's boundary may be determined dynamically (as described in FIG. 7) and it may be compared to the current resource usage of the activity. If the current resource usage has reached the activity's actual resource boundary, the request may be rejected. If the current resource usage has not reached the activity's actual resource boundary, the mechanisms may increase the activity's current resource usage counter and accept the request. Ultimately, if the resource request is accepted, the activity may notify a resource allocator (e.g., resource allocator module 255 in FIG. 2) once it is finished with the resource. This resource freeing procedure decrements the current resource usage counter of the activity by a factor of one (although the decrementing by a factor of one may be configured to decrement by a variety of factors such as by two, three, four, etc. based upon the needs and implementation requirements of a user).

Figure 7:
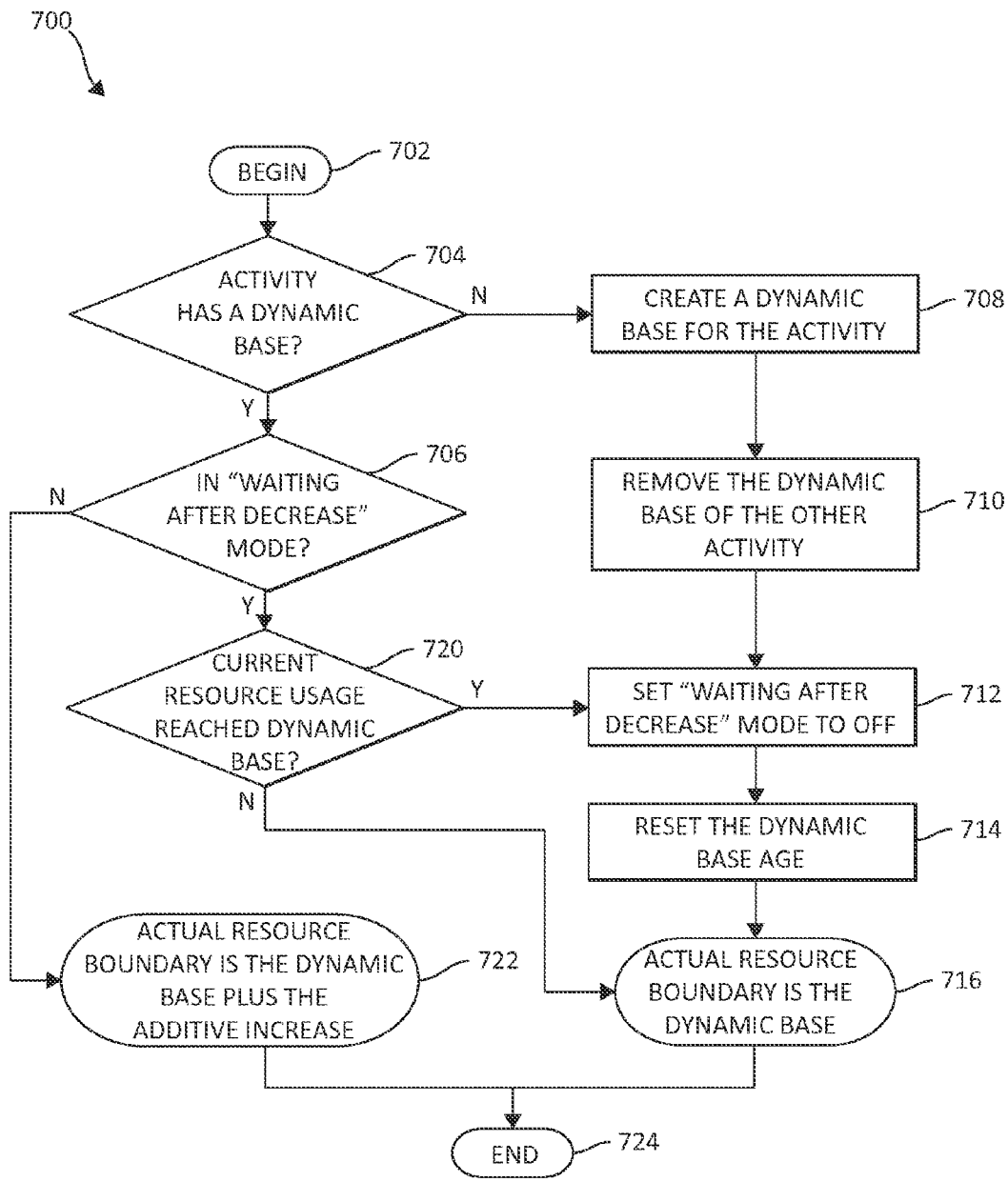
FIG. 7 is a flowchart illustrating an exemplary method for determining a resource boundary.

As mentioned in FIG. 6 (step 616), the activities actual resource boundary may be determined. FIG. 7 is a flowchart illustrating an exemplary method 700 for determining a resource boundary. The method 700 begins by determining if the activity has a dynamic base (step 704). If yes, the method 700 will then determine if the activity is in the wait after decrease mode (step 706). If no, the method 700 will then create a dynamic base for the activity (step 708). After the dynamic base is created, the dynamic base of the other dual activity may be removed (step 710). The wait after decrease mode may be set (turned) off (step 712) and the dynamic base age may be reset (step 714). The actual resource bases may now become and/or may be set to be the dynamic base (step 716). The method 700 ends (step 724). Now returning to step 706, if the activity is not in the wait after decrease mode, the actual resource boundary becomes and/or may be set to be the dynamic base with the addition of the additive increase (step 708) and the method 700 will then end (step 724). If the activity is in the wait after decrease mode, the method 700 will determine if the current resource usage has reached the dynamic base (step 720). If yes, the method 700 will move to step 712, and set the wait after decrease mode to off (step 712) and will continue from step 712 accordingly. If no, the actual resource boundary |[1]now becomes and/or is set to be the dynamic base (step 716) and the method 700 will then end (step 724)

In an alternative embodiment, the mechanisms for determining the activities actual resource boundary checks whether the activity is in dynamic mode. If the activity does not have a dynamic base, one may be created for it (initialized to the activity's static quota), the dynamic base age may be reset and the "wait after decrease" mode may be reset. Since only one of the dual activities may have a dynamic base at the same time, the other activity's dynamic base may be removed. The dynamic base (which is in this case is equal to the activity's static quota) may be returned. If the activity has a dynamic base, the procedure checks whether the activity is in "wait after decrease" mode. In case the wait after decrease mode is not active, the actual resource boundary returned may be the dynamic base with the addition of the dynamic additive increase. If the activity is indeed in "wait after decrease" mode, the mechanisms checks whether the current resource usage of the activity has reached the dynamic base. If the current resource usage of the activity has not reached the dynamic base then the activity may remain in "wait after decrease" mode, and the returned boundary may be the dynamic base. If the current resource usage of the activity has reached the dynamic base, then the "wait after decrease" mode may be finished and be turned off. The dynamic base age may be reset (in order for the additive increase mechanisms to skip the time the activity was held in the "wait after decrease" mode), and the dynamic base may be returned as the activity's actual resource boundary.

Figure 8:
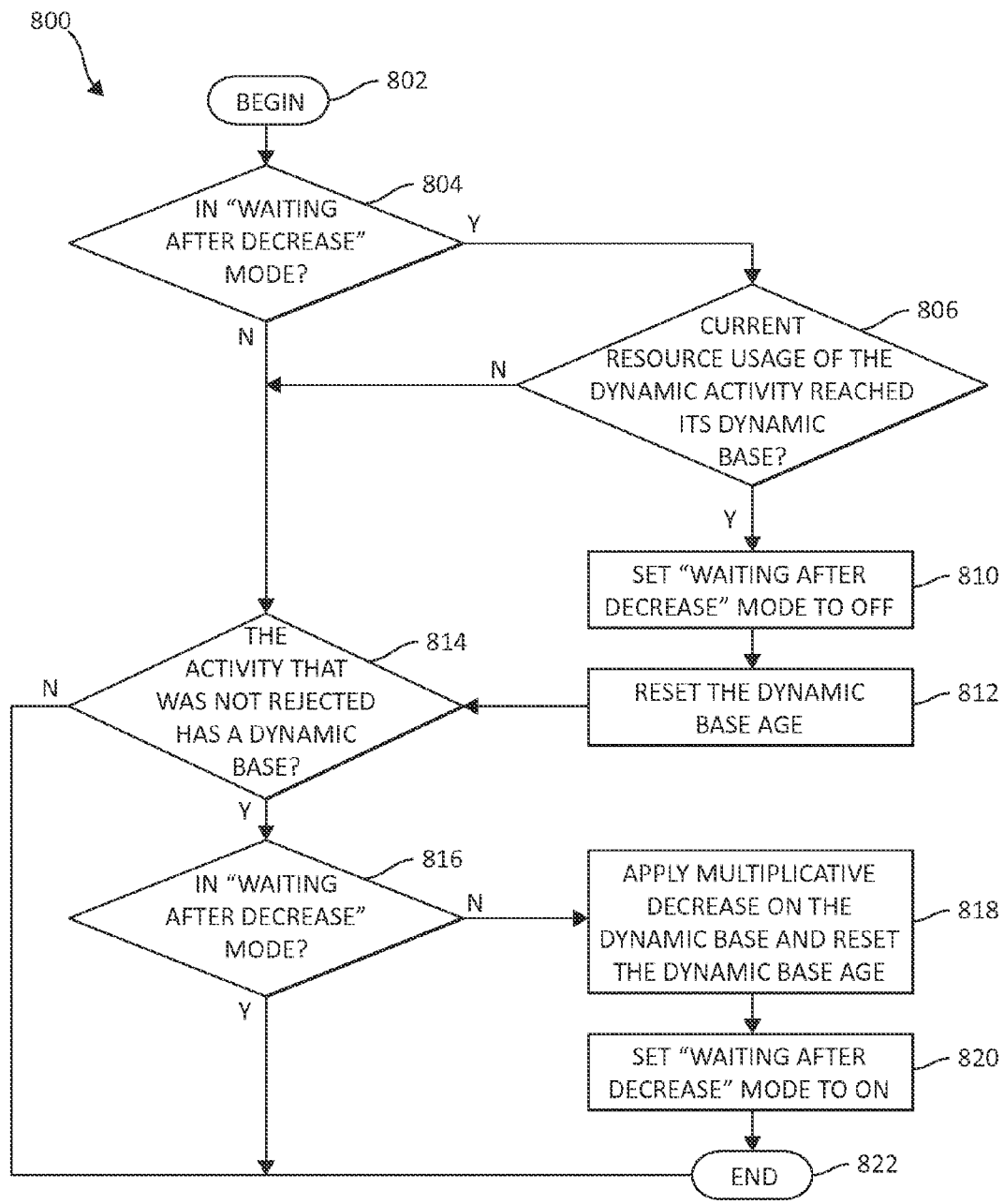
FIG. 8 is a flowchart illustrating an exemplary method for marking the rejection of a resource request.

As mentioned above in FIG. 6 (step 608) if the request is rejected, the rejection may be marked. To further illustrate the marking of the rejection, FIG. 8 is a flowchart illustrating an exemplary method 800 for the procedure for marking the rejection of a resource request. The method 800 begins (step 802) and the method 800 will determine if the activity is in the wait after decrease mode (step 804). If no, the method 800 will determine if the activity that was not rejected has a dynamic base (step 814). If the activity is in the wait after decrease mode, the method 800 determines if the current resource usage of the dynamic activity (more demanding dual activity) has reached the activities dynamic base (step 806). If no, the method 800 returns to step 814 to determine if the activity that was not rejected has a dynamic base. If yes, the wait after decrease mode may be set (turned) off (step 810). The dynamic base age may be reset (step 812). Upon resetting the dynamic base age, the method 800 returns to step 814 to determine if the activity that was not rejected has a dynamic base. If the activity that was not rejected has a dynamic base, the method 800 will determine if the activity is in the wait after decrease mode (step 816). If yes, the method 800 ends (step 822). If no, the method 800 will apply the multiplicative decrease on the dynamic base and reset the dynamic base age (step 818). The wait after decrease may then set to on (turned on) (step 820). The method 800 then ends (step 822). However, if the activity that was not rejected does not have a dynamic base, the method 800 ends (step 822).

In an alternative embodiment for marking the rejection of the resource request, the mechanisms determines whether the activity is in "wait after decrease" mode. If so, the mechanisms checks whether the "wait after decrease" mode should end (i.e. if the current resource usage of the activity that entered this mode is equal to or less than its dynamic base). If the mode should be turned off, the mechanisms update the state and reset the dynamic base age. Next, the mechanisms checks whether the other activity (i.e. the one that was not rejected) has a dynamic base. If no, then the other activities actual resource boundary may not be determined dynamically, and thus, no further action needs to be taken. Alternatively, if the other activity has a dynamic base, the other activity's actual resource boundary may need to be multiplicatively decreased. The mechanisms will then check whether the "wait after decrease" mode is turned on. If so, no decrease will place since the mechanisms are still waiting for the previous decrease to take effect. If the other activity has a dynamic base and it is not in "wait after decrease" mode, the actual resource boundary may be multiplicatively decreased according to equation (3). Since the dynamic base has changed, the dynamic base age may be reset and the "wait after decrease" mode may be turned on in order to allow the mechanisms to adjust to the multiplicative decrease.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A system for resource allocation of a plurality of resources for a dual activities system in a computing environment, comprising:
at least one processor device, operable in the computing environment, wherein the at least one processor device is adapted for:

starting at least two dual activities, wherein each of the dual activities is allocated its respective static quota of resources, determining which of the dual activities is a demanding dual activity, wherein the demanding dual activity requests resources in excess of its static quota, increasing an actual resource boundary for a resource request for the demanding dual activity until a resource request for the other dual activity is rejected, and in response to the rejection of the resource request for the other dual activity, performing each one of:
  calculating a reduced actual resource boundary for the demanding dual activity based on a multiplicative decrease of the dual activity's actual resource boundary,
  reducing the actual resource boundary of the demanding dual activity in accordance with the calculation, wherein the reducing does not reduce the actual resource boundary below the static quota of the demanding dual activity,
  causing the demanding dual activity to commence a wait after decrease mode, wherein the wait after decrease mode is a state where an actual resource boundary remains constant until the demanding dual activity's current resource usage is at or below its reduced resource boundary, and
  increasing an actual resource boundary of the other dual activity.

2. The system of claim 1, wherein the at least one processor device is further adapted for, pursuant to issuing the resource request by the dual activities, performing at least one of:
  determining the resource boundary of the dual activities,
  rejecting the resource request, wherein the resource request is rejected if at least one of:
    a total number of the plurality of resources issued to the dual activities has reached a global resource limit, wherein the resource request is marked as rejected,
    the total number of the plurality of resources issued to at least one of the dual activities has reached the resource boundary of the at least one of the dual activities, and
  increasing a current resource counter of the dual activities, accepting the resource request, and
  wherein the resource request is accepted and the current resource counter is increased if at least one of:
    the total number of the plurality of resources issued to the at least one of the dual activities is lower than one of the plurality of static quotas of the at least one of the dual activities,
    if the total number of the plurality of resources issued to an alternative one of the at least one of the dual activities has reached the resource boundary for the alternative one of the at least one of the dual activities, and
    if the total number of the plurality of resources issued to the at least one of the dual activities has reached an activity boundary for the at least one of the dual activities.

3. The system of claim 1, wherein the at least one processor device is further adapted for, pursuant to the determining the resource boundary, performing at least one of:
  determining if the dual activities is in a dynamic mode,
  if the at least one of the dual activities does not have a dynamic base, performing at least one of:
    creating a dynamic base, the dynamic base initialized to one of the plurality of static quotas,
    removing the dynamic base for the alternative one of the at least one of the dual activities,
    resetting a dynamic base age,
    resetting the wait after decrease mode, and
  if the at least one of the dual activities has a dynamic base, performing at least one of:
  determining if the at least one of the dual activities is in the wait after decrease mode, wherein if the at least one of the dual activities is not in the wait after decrease mode, returning the resource boundary along with a dynamic additive increase, otherwise performing at least one of:
    verifying if the current resource usage has reached the dynamic base,
    remaining in the wait after decrease mode if the current resource usage has not reached the dynamic base, otherwise:
    turning off the wait after decrease mode,
    resetting the dynamic base age, and
    returning the dynamic base as the resource boundary of the at least one of the dual activities.

4. The system of claim 1, wherein the at least one processor device is further adapted for, pursuant to the marking the resource request that is rejected, performing at least one of:
  if the dual activities is in the wait after decrease mode:
    determining if the current resource usage of the at least one of the dual activities has reached the dynamic base, wherein if the current resource usage has reached the dynamic base, setting the wait after decrease mode to off and resetting the dynamic base age,
  if the alternative one of the at least one of the dual activities that is not rejected has a dynamic base:
  decreasing the resource base multiplicatively,
  ascertaining if the wait after decrease mode is turned off, wherein if the wait after decrease mode is turned off:
    resetting the dynamic base age, and
    turning on the wait after decrease mode.

5. The system of claim 1, wherein the at least one processor device is further adapted for dynamically adjusting the plurality of resources in response to the resource request by a feedback control operation, wherein the plurality of resources are assigned to the more active one of the dual activities.

6. The system of claim 5, wherein the at least one processor device is further adapted for, pursuant to dynamically adjusting the plurality of resources in response to the resource request by a feedback control operation, performing at least one of:
  verifying the less active one of the dual activities will not be deprived of the plurality of resources, and
  assigning at least one of the plurality of resources to the less active one of the dual activities upon a resource request.

7. The system of claim 6, wherein the at least one processor device is further adapted for performing at least one of:
  maintaining the current resource usage and the resource boundary for each of the dual activities, and
  sending a notification when the dual activities is completed with an issued one of the plurality of resources and updating the current resource usage.

8. A computer program product for resource allocation of a plurality of resources for a dual activities system by a processor device, the computer program product comprising a non-transitory computer-readable storage medium having computer-readable program code portions stored therein, the computer-readable program code portions comprising:
  a first executable portion for starting at least two dual activities, wherein each of the dual activities is allocated its respective static quota of resources;

a second executable portion for determining which of the dual activities is a demanding dual activity, wherein the demanding dual activity requests resources in excess of its static quota;

a third executable portion for increasing an actual resource boundary for a resource request for the demanding dual activity until a resource request for the other dual activity is rejected; and in response to the rejection of the resource request for the other dual activity, a fourth executable portion for performing at each one of:
- calculating a reduced actual resource boundary for the demanding dual activity based on a multiplicative decrease of the dual activity's actual resource boundary,
- reducing the actual resource boundary of the demanding dual activity in accordance with the calculation, wherein the reducing does not reduce the actual resource boundary below the static quota of the demanding dual activity,
- causing the demanding dual activity to commence a wait after decrease mode, wherein the wait after decrease mode is a state where an actual resource boundary remains constant until the demanding dual activity's current resource usage is at or below its reduced resource boundary, and
- increasing an actual resource boundary of the other dual activity.

9. The computer program product of claim 8, further including a fourth executable portion for pursuant to issuing the resource request by the dual activities, performing at least one of:
- determining the resource boundary of the dual activities,
- rejecting the resource request, wherein the resource request is rejected if at least one of:
  - a total number of the plurality of resources issued to the dual activities has reached a global resource limit, wherein the resource request is marked as rejected,
  - the total number of the plurality of resources issued to at least one of the dual activities has reached the resource boundary of the at least one of the dual activities, and
- increasing a current resource counter of the dual activities, accepting the resource request, and
- wherein the resource request is accepted and the current resource counter is increased if at least one of:
  - the total number of the plurality of resources issued to the at least one of the dual activities is lower than one of the plurality of static quotas of the at least one of the dual activities,
  - if the total number of the plurality of resources issued to an alternative one of the at least one of the dual activities has reached the resource boundary for the alternative one of the at least one of the dual activities, and
  - if the total number of the plurality of resources issued to the at least one of the dual activities has reached an activity boundary for the at least one of the dual activities.

10. The computer program product of claim 8, further including a fourth executable portion for, pursuant to the determining the resource boundary, performing at least one of:
- determining if the dual activities is in a dynamic mode,
- if the at least one of the dual activities does not have a dynamic base, performing at least one of:
  - creating a dynamic base, the dynamic base initialized to one of the plurality of static quotas,
  - removing the dynamic base for the alternative one of the at least one of the dual activities,
  - resetting a dynamic base age,
  - resetting the wait after decrease mode, and
- if the at least one of the dual activities has a dynamic base, performing at least one of:
- determining if the at least one of the dual activities is in the wait after decrease mode, wherein if the at least one of the dual activities is not in the wait after decrease mode, returning the resource boundary along with a dynamic additive increase, otherwise performing at least one of:
  - verifying if the current resource usage has reached the dynamic base,
  - remaining in the wait after decrease mode if the current resource usage has not reached the dynamic base, otherwise:
    - turning off the wait after decrease mode,
    - resetting the dynamic base age, and
    - returning the dynamic base as the resource boundary of the at least one of the dual activities.

11. The computer program product of claim 8, further including a fourth executable portion for, pursuant to the marking the resource request that is rejected, performing at least one of:
- if the dual activities is in the wait after decrease mode:
  - determining if the current resource usage of the at least one of the dual activities has reached the dynamic base, wherein if the current resource usage has reached the dynamic base, setting the wait after decrease mode to off and resetting the dynamic base age,
- if the alternative one of the at least one of the dual activities that is not rejected has a dynamic base:
  - decreasing the resource base multiplicatively,
  - ascertaining if the wait after decrease mode is turned off, wherein if the wait after decrease mode is turned off:
  - resetting the dynamic base age, and
  - turning on the wait after decrease mode.

12. The computer program product of claim 11, further including a fourth executable portion for dynamically adjusting the plurality of resources in response to the resource request by a feedback control operation, wherein the plurality of resources are assigned to the more active one of the dual activities.

13. The computer program product of claim 12, further including a fifth executable portion for performing at least one of:
- maintaining the current resource usage and the resource boundary for each of the dual activities,
- sending a notification when the dual activities is completed with an issued one of the plurality of resources and updating the current resource usage, and
- pursuant to dynamically adjusting the plurality of resources in response to the resource request by a feedback control operation, performing at least one of:
  - verifying the less active one of the dual activities will not be deprived of the plurality of resources, and
  - assigning at least one of the plurality of resources to the less active one of the dual activities upon a resource request.

* * * * *